UNITED STATES PATENT OFFICE.

ANSON G. BETTS, OF TROY, NEW YORK.

PROCESS OF TREATING ANODE RESIDUES.

SPECIFICATION forming part of Letters Patent No. 712,640, dated November 4, 1902.

Application filed August 24, 1901. Serial No. 73,147. (No specimens.)

*To all whom it may concern:*

Be it known that I, ANSON G. BETTS, a citizen of the United States, residing at Troy, county of Rensselaer, and State of New York, have invented certain new and useful Improvements in Processes of Treating Anode Residues Produced in Electrolytically Refining Lead, of which the following is a specification.

This invention relates to a process for separating the lead, copper, antimony, and arsenic from the silver usually present in sufficient quantity to make the subsequent treatment of the silver more economical and for recovering the lead, copper, antimony, and arsenic in commercially-useful form.

The object of my invention is to reduce the costs and losses attending the treatment of this material by known methods.

By my present method I remove a considerable proportion of the lead, copper, antimony, and arsenic as chlorids from the anode residues by applying thereto a chlorinating agent, such as potassium chlorate or ferric salts in hydrochloric-acid solution. I have found out that the material being treated may be suspended in hydrochloric-acid solution and a current of air blown through the mixture with a rather rapid solution of the metals which form soluble chlorids. I prefer to use chlorin to chlorinate the metals, and especially prefer to have water present to take the chlorids formed into solution, which by the properties of the metals to form perchlorids soluble in water with chlorin and to react with the perchlorids to reform subchlorids insure that no chlorin is lost. Enough chlorin should be introduced to convert most of the lead, copper, antimony, and arsenic present into lead chlorid, cuprous chlorid, antimony trichlorid, and arsenic trichlorid, respectively.

The solution produced when separated from the insoluble portion, mostly metallic silver, may be treated for the recovery of the metals in it in any known manner.

I prefer to distil off first the water, of which rather a small quantity need be present, except in the rather unusual case when much copper is present, then the arsenic chlorid, and, finally, the antimony chlorid, while bismuth chlorid when present and copper and lead chlorids are allowed to remain undistilled. The lead dissolved as chlorid from the anode residues may be removed by precipitation with sulfuric acid, if desired. If the chlorin used be produced electrolytically, an amount of sodium hydroxid solution sufficient to convert the chlorids produced into oxids will be produced. This affords an easy method for recovering the arsenic and antimony in the form of oxids or salts—for instance, cupric arsenite and antimony trioxid. The latter can be directly smelted to metal. The separation of the undistilled salts is easy to carry out. Treatment with water dissolves copper chlorid and lead chlorid if present, while the bismuth and undistilled antimony remain undissolved as oxychlorids. Copper may be removed from the solution by precipitation with metallic iron, and the metals may be recovered from the oxychlorids by smelting. I prefer to dissolve the antimony from the oxychlorids by caustic soda, leaving bismuth oxid undissolved.

The extent to which the chlorination may be carried in using my process may be varied very much, the principal object being the removal of a considerable portion of the antimony, which interferes most in the subsequent refining of the unchloridized portion. Also the chlorination may be carried so far as to convert silver into chlorid, which is removed to only a small extent on account of its insolubilty.

The unchloridized portion of the anode residue is scorified and cupelled or treated by any of the known methods used in treating anode residues from electrolytic copper refining.

What I claim as new, and desire to secure by Letters Patent, is—

1. The herein-described process of treating anode residues containing lead, copper, antimony and arsenic from the electrolytic refining of lead alloy, which consists in combining a part of the lead, copper, antimony and arsenic present with chlorin gas, and of removing the soluble chlorids from the remainder.

2. The herein-described process of treating anode residues containing lead, copper, antimony and arsenic from the electrolytic refining of lead alloy, which consists in combining a part of the lead, copper, antimony and arsenic present with chlorin gas, and of removing the soluble chlorids from the remainder in solution.

3. The herein-described process of treating anode residues containing lead, copper, antimony and arsenic from the electrolytic refining of lead alloy, which consists in combining a part of the lead, copper, antimony and arsenic present with chlorin gas, of removing them as chlorids in solution and of distilling off the water, antimonious and arsenious chlorids from said solution.

In testimony whereof I have hereunto set my hand this 23d day of August, 1901.

ANSON G. BETTS.

Witnesses:
S. D. NICHOLS,
A. W. BURDICK.